US012600675B2

(12) United States Patent
Zheng et al.

(10) Patent No.: US 12,600,675 B2
(45) Date of Patent: Apr. 14, 2026

(54) CERAMIC MATERIAL FOR THERMAL BARRIER COATING AND MANUFACTURING METHOD THEREOF

(71) Applicant: Nanchang Hangkong University, Nanchang (CN)

(72) Inventors: Haizhong Zheng, Nanchang (CN); Pengsen Zhao, Nanchang (CN); Yongxiang Geng, Nanchang (CN); Xinpeng Cao, Nanchang (CN); Peifeng Zhou, Nanchang (CN); Yixin Xiao, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 824 days.

(21) Appl. No.: 17/822,648

(22) Filed: Aug. 26, 2022

(65) Prior Publication Data

US 2024/0067573 A1      Feb. 29, 2024

(51) Int. Cl.
| | |
|---|---|
| *C04B 35/50* | (2006.01) |
| *C04B 35/497* | (2006.01) |
| *C04B 35/626* | (2006.01) |
| *C04B 35/64* | (2006.01) |

(52) U.S. Cl.
CPC ........ *C04B 35/497* (2013.01); *C04B 35/6261* (2013.01); *C04B 35/62655* (2013.01); *C04B 35/64* (2013.01); *C04B 2235/3227* (2013.01);

*C04B 2235/3229* (2013.01); *C04B 2235/606* (2013.01); *C04B 2235/668* (2013.01); *C04B 2235/9607* (2013.01)

(58) Field of Classification Search
CPC .... C04B 2235/3227; C04B 2235/3229; C04B 2235/3244; C04B 2235/3224
See application file for complete search history.

(56) References Cited

U.S. PATENT DOCUMENTS

| | | | |
|---|---|---|---|
| 2007/0160859 A1* | 7/2007 | Darolia | ................. C23C 28/321 |
| | | | 428/472 |
| 2019/0161843 A1* | 5/2019 | Kim | .......................... C23C 4/11 |

* cited by examiner

*Primary Examiner* — Laura A Auer
(74) *Attorney, Agent, or Firm* — Sang Young Han

(57) ABSTRACT

The present disclosure provides a ceramic material for a thermal barrier coating and a manufacturing method thereof. A chemical composition of the ceramic material is LaYbZr-CeO7. The ceramic material is manufactured by doping LaO1.5, YbO1.5 and CeO2 into ZrO2. A mole ratio of LaO1.5, YbO1.5, CeO2 and ZrO2 is 1:1:1:1. The manufactured ceramic material is in a composite phase structure mainly including a pyrochlore phase and a fluorite phase. The ceramic material according to the present disclosure can effectively inhibit corrosion penetration of molten CMAS in a high temperature environment, which reduces or avoids ceramic cracking and peeling. This better maintains microstructural integrity of the ceramic surface, thereby extending service life of ceramics.

9 Claims, 3 Drawing Sheets

CERAMIC MATERIAL FOR THERMAL BARRIER COATING AND MANUFACTURING METHOD THEREOF

FIELD

The present disclosure relates to the technical field of thermal barrier coatings, in particular to a ceramic material for a thermal barrier coating and a manufacturing method thereof.

BACKGROUND

A thermal barrier coating is attached to a metal substrate surface of a turbine blade in the form of coating, which can effectively reduce a temperature of the metal substrate surface, thereby preventing it from high-temperature oxidation and corrosion. Yttria partially stabilized zirconia (YSZ) coating with a low thermal conductivity and a high thermal expansion coefficient has become the most widely used thermal barrier coating material. However, as the aeroengine rapidly develops towards a high thrust-to-weight ratio, its working temperature is further increased, resulting in that defects of the YSZ coating are particularly prominent. When above 1200° C., the YSZ coating undergoes $ZrO_2$ phase change, i.e., $t$-$ZrO_2$→$m$-$ZrO_2$, and at the same time undergoes volume change, which produces a thermal stress, thereby causing premature peeling failure of the coating. Therefore, the conventional YSZ thermal barrier coating can no longer meet design and use requirements for high-temperature working environment of the aeroengine.

In recent years, in order to meet the urgent demand for a high thrust-to-weight ratio of the aeroengine, experts from home and abroad have begun to develop a series of new ceramics for the thermal barrier coating, such as $La_2Zr_2O_7$, $Gd_2Zr_2O_7$, $Sm_2Zr_2O_7$, etc. Among them, $La_2Zr_2O_7$ has advantages of low thermal conductivity and high-temperature phase stability. In particular, the thermal conductivity of $La_2Zr_2O_7$ is even lower than that of the YSZ coating. When at a temperature of 1000° C., the thermal conductivity of $La_2Zr_2O_7$ is about 1.85 $W\cdot m^{-1}\cdot K^{-1}$, which is much lower than that of the YSZ coating, which is 1.98 $W\cdot m^{-1}\cdot K^{-1}$. Therefore, $La_2Zr_2O_7$ has become a ceramic material for the thermal barrier coating with great application prospects.

However, in a high temperature environment, the coating is susceptible to corrosion by a glassy substance mainly composed of CaO, MgO, $Al_2O_3$ and $SiO_2$ (calcium-magnesium-alumina-silicate, CMAS for short), which is a fatal defect of the coating. The fundamental way to improve this defect is to increase its high-temperature chemical inertness, so as to inhibit molten CMAS corrosion. How to improve the CMAS corrosion resistance of $La_2Zr_2O_7$ coating has become the most urgent problem to be solved.

In the related art, Chinese Patent No. CN103966539A discloses a plasma evaporation deposition lanthanide thermal barrier coating ceramic layer with long service life, high thermal insulation performance and a composite structure, and a manufacturing method thereof. The ceramic layer material is composed of lanthanide zirconate or cerate. The thermal barrier coatings include an adhesive layer, a first ceramic layer and a second ceramic layer that are manufactured on a substrate. The first ceramic layer is a YSZ coating, and the second ceramic layer is composed of lanthanide zirconate or cerate. The lanthanide zirconate is a zirconate of any one element of Gd, Eu, Sm, Nd and La. The cerate is a $La_2Ce_2O_7$. The thermal insulation performance is improved by the combination of the YSZ coating and the lanthanide thermal barrier coating ceramic layer.

Chinese Patent No. CN113046678A discloses a thermal barrier coating with a novel double-ceramic-layer structure and a manufacturing method thereof. The thermal barrier coating is composed of MCrAlY bonding layer and a ceramic surface layer, the ceramic surface layer being formed by stacking YSZ and a double-ceramic-layer element composed of novel ceramic materials such as $La_2Zr_2O_7$, $La_2Ce_2O_7$, $La_2(Zr_{0.7}Ce_{0.3})_2O_7$ or $LaMgAl_{11}O_{19}$. The number of times of stacking of the double-ceramic-layer element is more than 2. M in the MCrAlY bonding layer states for Ni, Co, or NiCo. The double-ceramic-layer stacked structure has advantages in terms of resistance to high-temperature flame flushing, ablation and heat insulation.

Chinese Patent No. CN101265561 discloses a thermal barrier coating ceramic layer material with transient ultra-high temperature resistance, which is a $Nb_2O_5$ doping YSZ-YSH ceramic layer material consisting 1-5 mole percent of $Y_2O_3$, 1-40 mole percent of $HfO_2$, 1-5 mole percent of $Nb_2O_5$ and the rest of $ZrO_2$. The thermal barrier coating ceramic layer material can bear a transient ultrahigh temperature at 2500K-3000K per second, gas thermal shock at Mach node 3-6 as well as scouring and ablation.

In the related art, no studies have been found on thermal barrier coatings with CMAS corrosion resistance ability, and the problem of how to improve the CMAS corrosion resistance ability of the $La_2Zr_2O_7$ coating has not been solved.

SUMMARY

In order to solve the above technical problem, the present disclosure aims to provide a ceramic material for a thermal barrier coating and a manufacturing method thereof, so as to solve the problem that molten CMAS is easy to corrode and penetrate the thermal barrier coating in a high temperature environment.

Technical Solutions Adopted are:

The present disclosure provides a ceramic material for a thermal barrier coating, a chemical composition of which is $LaYbZrCeO_7$.

Further, the ceramic material is manufactured by doping $LaO_{1.5}$, $YbO_{1.5}$ and $CeO_2$ into $ZrO_2$.

Further, a mole ratio of $LaO_{1.5}$, $YbO_{1.5}$, $CeO_2$ and $ZrO_2$ is 1:1:1:1.

Further, the manufactured ceramic material is in a composite phase structure mainly including a pyrochlore phase and a fluorite phase.

Further, the ceramic material still maintains good microstructural integrity, after CMAS corrodes the ceramic material at a temperature of 1250° C. for 30 minutes.

The present disclosure provides a manufacturing method of the ceramic material for a thermal barrier coating, including:

S1. placing powders $La_2O_3$, $Yb_2O_3$, $ZrO_2$ and $CeO_2$ respectively in a box dryer for drying and heat preservation, to remove residual impurities;

S2. weighing the powders in a mole ratio of $25LaO_{1.5}$-$25YbO_{1.5}$-$25ZrO_2$-$25CeO_2$, dissolving the powders in pure alcohol, and performing mechanical ball milling, to obtain a mixed product;

S3. drying the mixed product in a vacuum drying oven and taking it out, to obtain a dry fine powder for later use;

S4. cold-pressing the obtained dry fine powder into a ceramic body at 350-400 MPa, and performing pressureless sintering in a tube furnace at 1550-1600° C., to manufacture the ceramic material.

Further, in S1, in the box dryer, a drying temperature is set to 100-110° C., and the heat preservation is performed for 3-4 hours.

Further, in S2, the mechanical ball milling is performed at 350-400 r/min for 8-10 hours.

Further, in S3, the mixed product is dried in the vacuum drying oven at 65-70° C. for 24-30 hours and then taken out.

Further, the obtained dry fine powder is cold-pressed into the ceramic body at 350-400 MPa for 5-10 minutes, and the pressureless sintering is performed in the tube furnace at 1550-1600° C. for 12-14 hours.

The beneficial effects of the present disclosure are:

The ceramic material for a thermal barrier coating according to the present disclosure is manufactured by co-doping multiple rare earth elements with $ZrO_2$, and is in the composite phase structure mainly including the pyrochlore phase and the fluorite phase. The ceramic material for a thermal barrier coating can effectively inhibit the corrosion penetration of molten CMAS in a high temperature environment, which reduces or avoids ceramic cracking and peeling. This better maintains microstructural integrity of the ceramic surface, thereby extending the service life of ceramics. At the same time, the ceramic material for a thermal barrier coating is manufactured through the conventional pressureless sintering approach, which allows the manufacturing process to be simple, efficient and low-cost, thereby being easy to realize industrial production.

DETAILED DESCRIPTION OF EMBODIMENTS

The present disclosure will be detailed in the following through specific embodiments. However, the use and purpose of these exemplary embodiments are merely used to exemplify the present disclosure, do not limit the actual protection scope of the present disclosure in any form, and do not limit the protection scope of the present invention to this.

Embodiment 1

The manufacturing method of a ceramic material for a thermal barrier coating according to this embodiment includes the following steps:

S1. Powders $La_2O_3$, $Yb_2O_3$, $ZrO_2$ and $CeO_2$ (purities 99.99%) are placed in a box dryer respectively, and heat preservation is performed for 3 hours at a temperature of 100° C., to remove residual impurities (i.e., removing adsorbed water or carbon dioxide).

S2. The powders are weighed according to a ratio of $25LaO_{1.5}$-$25YbO_{1.5}$-$25ZrO_2$-$25CeO_2$ (mol %), dissolved in pure alcohol, and undergo mechanical ball milling at 350 r/min for 8 hours, to obtain a mixed product.

S3. The mixed product is dried in a vacuum drying oven at 65° C. for 24 hours, and then taken out, to obtain a dry fine powder for later use.

S4. The obtained dry fine powder is cold-pressed into a ceramic body at 350 MPa for 5 minutes, and undergoes pressureless sintering in a tube furnace at 1550° C. for 12 hours, to manufacture a ceramic bulk sample $LaYbZrCeO_7$ ($\Phi$ 10 mm×3 mm).

The manufactured ceramic bulk sample $LaYbZrCeO_7$ (hereinafter referred to as the ceramic sample $LaYbZrCeO_7$) is compared with a ceramic bulk sample $La_2Zr_2O_7$ (hereinafter referred to as the ceramic sample $La_2Zr_2O_7$), to better show that the ceramic sample $LaYbZrCeO_7$ has CMAS high-temperature corrosion resistance performance.

Figure 1:
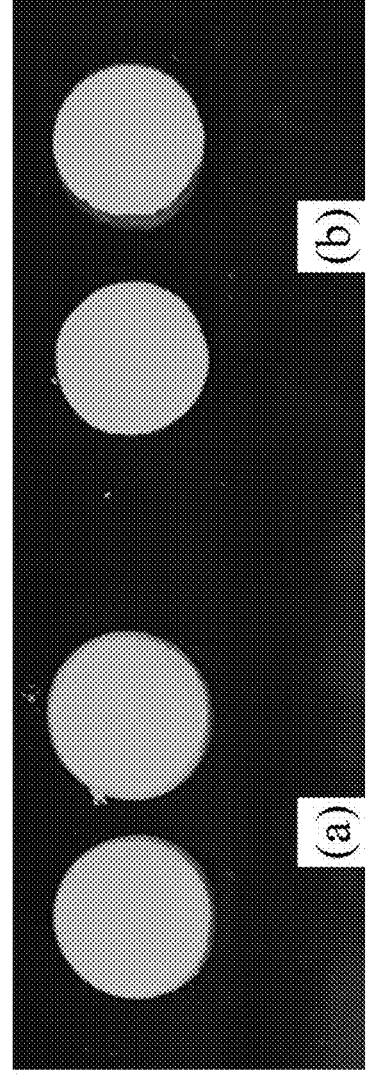
FIG. 1 shows macroscopic schematic diagrams of ceramic material samples for thermal barrier coatings after coating CMAS: (a) $La_2Zr_2O_7$, and (b) $LaYbZrCeO_7$.

FIG. 1 shows macroscopic schematic diagrams of the ceramic sample $La_2Zr_2O_7$ and the ceramic sample $LaYbZrCeO_7$ after coating CMAS.

As shown in FIG. 1, the CMAS ($33CaO$-$9MgO$-$13AlO_{1.5}$-$45SiO_2$, mol %) powder was uniformly coated on a surface of the ceramic sample $La_2Zr_2O_7$ and a surface of the ceramic sample $LaYbZrCeO_7$, with a concentration of 15 $mg/cm^2$.

Figure 2:
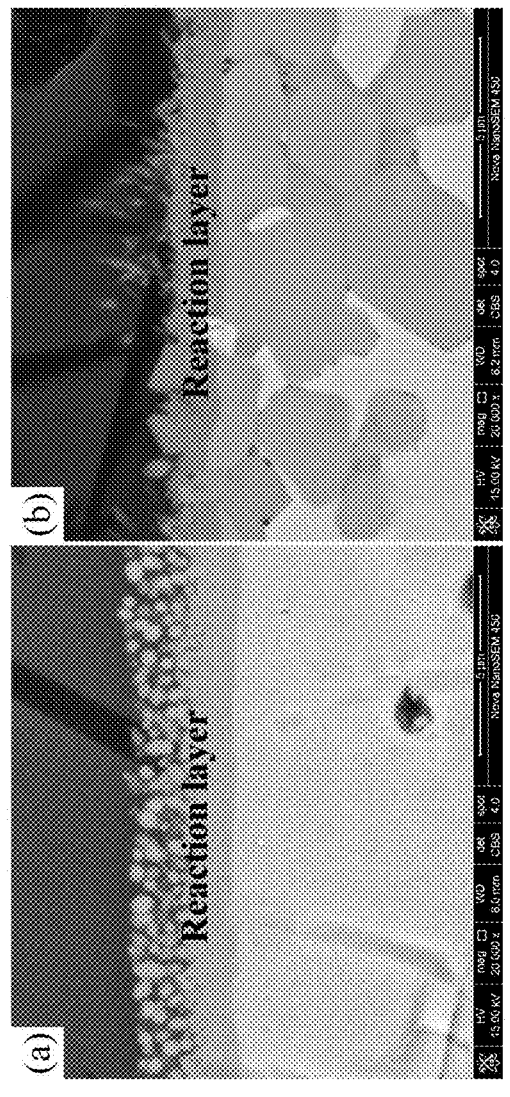
FIG. 2 shows cross-sectional morphologies (1250° C., 5 minutes) of ceramic material samples for thermal barrier coatings after CMAS corrosion: (a) $La_2Zr_2O_7$, and (b) $LaYbZrCeO_7$.

FIG. 2 shows cross-sectional morphologies (1250° C., 5 minutes) of the ceramic sample $La_2Zr_2O_7$ and the ceramic sample $LaYbZrCeO_7$ after CMAS corrosion.

As shown in FIG. 2(a), the ceramic sample $La_2Zr_2O_7$ is severely corroded by the molten CMAS, forming a loose and micro-cracked reaction layer of a thickness of about 2.7 m, and the CMAS has completely filled the cracks. However, a reaction layer in the ceramic sample $LaYbZrCeO_7$ has a depth of only 1.5 m (FIG. 2(b)), and is relatively dense with only a few cracks, which indicates that the $LaYbZrCeO_7$ has good CMAS high-temperature corrosion resistance performance.

Embodiment 2

Figure 3:
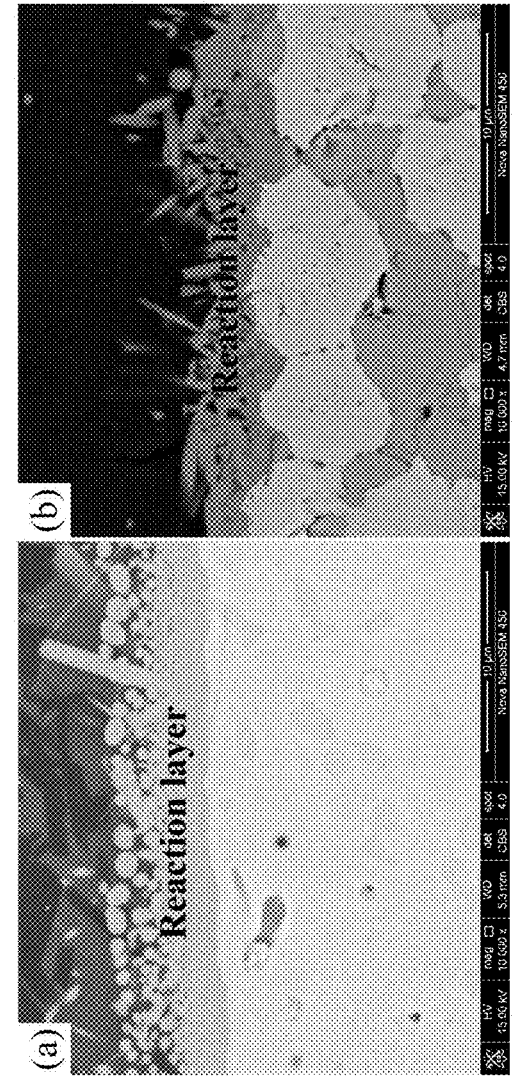
FIG. 3 shows ceramic cross-sectional morphologies (1250° C., 30 minutes) of ceramic material samples for thermal barrier coatings after CMAS corrosion: (a) $La_2Zr_2O_7$, and (b) $LaYbZrCeO_7$.

On the basis of embodiment 1, FIG. 3 shows cross-sectional morphologies (1250° C., 30 minutes) of the ceramic sample $La_2Zr_2O_7$ and the ceramic sample $LaYbZrCeO_7$ after CMAS corrosion.

As shown in FIG. 3(a), the microstructure of the ceramic sample $La_2Zr_2O_7$ is severely damaged, with a large number of ceramic particles peeled into the CMAS to form a reaction layer of a thickness of about 6.2 μm, which indicates that the $La_2Zr_2O_7$ has poor CMAS high-temperature corrosion resistance performance. However, the ceramic sample $LaYbZrCeO_7$ only has a small number of ceramic particles peeled off, thus maintaining good microstructural integrity, and the depth of its reaction layer is only 4.0 μm. This once again shows that the ceramic sample $LaYbZrCeO_7$ has excellent CMAS high-temperature corrosion resistance performance.

The series of detailed descriptions listed above are only specific descriptions of the feasible embodiments of the present disclosure, they are not intended to limit the scope of protection of the present disclosure, and any equivalent embodiment or modification made without departing from the technical spirit of the present disclosure should be included in the scope of protection of the present disclosure.

What is claimed is:

1. A ceramic material for a thermal barrier coating, having a chemical composition represented by $LaYbZrCeO_7$ and manufactured by doping $LaO_{1.5}$, $YbO_{1.5}$ and $CeO_2$ into $ZrO_2$.

2. The ceramic material according to claim 1, wherein a mole ratio of $LaO_{1.5}$, $YbO_{1.5}$, $CeO_2$ and $ZrO_2$ is 1:1:1:1.

3. The ceramic material according to claim 1, wherein the manufactured ceramic material is in a composite phase structure comprising a pyrochlore phase and a fluorite phase.

4. The ceramic material according to claim 1, wherein the ceramic material has a reaction layer with a depth of 4 μm after calcium-magnesium-alumina-silicate (CMAS) corrodes the ceramic material at a temperature of 1250° C. for 30 minutes.

5. A manufacturing method for producing a ceramic material as defined in claim 1, comprising:

S1. placing powders $La_2O_3$, $Yb_2O_3$, $ZrO_2$ and $CeO_2$ respectively in a box dryer for drying and heat preservation, to remove residual impurities;

S2. weighing the powders in a mole ratio of $25LaO_{1.5}$-$25YbO_{1.5}$-$25ZrO_2$-$25CeO_2$, dissolving the powders in pure alcohol, and performing mechanical ball milling, to obtain a mixed product;

S3. drying the mixed product in a vacuum drying oven and taking it out, to obtain a dry fine powder for later use;

S4. cold-pressing the obtained dry fine powder into a ceramic body at 350-400 MPa, and performing pressureless sintering in a tube furnace at 1550-1600° C., to manufacture the ceramic material.

6. The manufacturing method of the ceramic material according to claim 5, wherein in S1, in the box dryer, a drying temperature is set to 100-110° C., and the heat preservation is performed for 3-4 hours.

7. The manufacturing method of the ceramic material according to claim 5, wherein in S2, the mechanical ball milling is performed at 350-400 r/min for 8-10 hours.

8. The manufacturing method of the ceramic material according to claim 5, wherein in S3, the mixed product is dried in the vacuum drying oven at 65-70° C. for 24-30 hours and then taken out.

9. The manufacturing method of the ceramic material according to claim 5, wherein the obtained dry fine powder is cold-pressed into the ceramic body at 350-400 MPa for 5-10 minutes, and the pressureless sintering is performed in the tube furnace at 1550-1600° C. for 12-14 hours.

* * * * *